United States Patent
Matsumoto et al.

(10) Patent No.: US 6,634,549 B1
(45) Date of Patent: *Oct. 21, 2003

(54) IC CARD AUTOMATED TRANSACTION TERMINAL AND IC USED THEREIN

(75) Inventors: Kenji Matsumoto, Yokohama (JP); Shigeyuki Itoh, Kawasaki (JP); Yutaka Takami, Yokohama (JP); Masayuki Inoue, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/417,008

(22) Filed: Oct. 12, 1999

(30) Foreign Application Priority Data

Nov. 21, 1995 (JP) .............................. 7-302458

(51) Int. Cl.⁷ .............................................. G06F 17/60
(52) U.S. Cl. ...................... 235/379; 235/380; 235/382; 235/375; 705/41; 705/35
(58) Field of Search ................................ 235/375, 380, 235/381, 487; 705/14

(56) References Cited

U.S. PATENT DOCUMENTS

| | | | | |
|---|---|---|---|---|
| 4,734,564 A | * | 3/1988 | Boston et al. ............... | 235/375 |
| 4,837,422 A | | 6/1989 | Dethloff et al. ............. | 235/380 |
| 5,506,397 A | | 4/1996 | Hoshino ....................... | 235/492 |
| 5,521,362 A | * | 5/1996 | Powers ....................... | 235/375 |
| 5,563,395 A | | 10/1996 | Hoshino ....................... | 235/380 |
| 5,578,808 A | * | 11/1996 | Taylor .......................... | 235/375 |
| 5,734,838 A | * | 3/1998 | Robinson et al. .............. | 705/14 |
| 5,992,738 A | * | 11/1999 | Matsumoto et al. ......... | 235/375 |
| 6,012,635 A | * | 1/2000 | Shimada et al. ............. | 235/375 |
| 6,327,573 B1 | * | 12/2001 | Walker et al. ................. | 705/14 |

FOREIGN PATENT DOCUMENTS

| | | | |
|---|---|---|---|
| EP | 0668581 A1 | | 8/1995 |
| FR | 2616940 | | 12/1988 |
| FR | 2762424 A | * | 4/1997 |
| FR | WO 9844463 A | * | 10/1998 |

* cited by examiner

*Primary Examiner*—Michael G. Lee
*Assistant Examiner*—Ahshik Kim
(74) *Attorney, Agent, or Firm*—Antonelli, Terry, Stout & Kraus, LLP

(57) ABSTRACT

An IC card automated transaction terminal is provided to operate in conjunction with an IC card capable of storing a plurality of different balances relating to commercial transactions. For example, the IC card can provide separate storage for electronic money information and bonus point information. IC card reading/writing means are provided in the terminal for reading and writing such information stored in said IC card along with input means for inputting transacted sum information and information storage means for storing electronic money information equivalent to transacted sum information. In another embodiment, small sum and large sum balances can be separately stored on the IC card, with only the large sum balance being locked and requiring a security code to carry out a transaction.

14 Claims, 13 Drawing Sheets

FIG. 2

| SHOP NUMBER | DATE | POINT | TOTAL POINTS |
|---|---|---|---|
| A0001 | 1995. 4. 3<br>1995. 4. 30<br>.... | 300<br>1000<br>.... | 300<br>1300<br>.... |
| A0024 | 1995. 5. 5<br>1995. 6. 2<br>1995. 6. 5<br>.... | 1000<br>-1000<br>500<br>.... | 1000<br>0<br>500<br>.... |
| B0007 | 1995. 5. 2<br>1995. 6. 30<br>.... | 500<br>700<br>.... | 500<br>1200<br>.... |
| .... | .... | .... | .... |

FIG. 13

| SHOP NUMBER | CONTENTS OF SERVICE | DATE | POINT | TOTAL POINTS |
|---|---|---|---|---|
| A0001 | A | 1995. 4. 3<br>1995. 4. 30<br>.... | 300<br>1000<br>.... | 300<br>1300<br>.... |
| A0024 | C | 1995. 5. 5<br>1995. 6. 2<br>1995. 6. 5<br>.... | 1000<br>-1000<br>500<br>.... | 1000<br>0<br>500<br>.... |
| B0007 | B | 1995. 5. 2<br>1995. 6. 30<br>.... | 500<br>700<br>.... | 500<br>1200<br>.... |
| .... | .... | .... | .... | .... |

A: ADD 7% TO POINT
B: ADD 5% TO POINT
C: ADD 3% TO POINT

IC CARD AUTOMATED TRANSACTION TERMINAL AND IC USED THEREIN

BACKGROUND OF THE INVENTION

1. Field of the Invention

The present invention relates to an electronic wallet applied system for providing a variety of service information in addition to electronic money information in an IC card used for a commercial transaction using an electronic wallet system.

2. Description of the Related Art

At present, retail stores such as large-sized household electric appliances shops, compact disc shops, gas stations and others provide a variety of premium services as an incentive, or reward, program for their regular customers. Typically, the premium services correspond to the sum of shopping by their specific customers who contract with their shops. Particularly, such shops often issue point information based upon the sum of shopping and often provide a cash value coupon or a gift certificate equivalent to the point information to such customers. In this case, point information is generally stored in a magnetic card.

In the meantime, as disclosed in Japanese published unexamined patent application No. H3-92966, transactions using no cash by an electronic wallet system using an IC card have been developed. This is a system in which commercial transaction can be completed without using any cash by writing arbitrarily specified sum information to the memory of an IC card and sending required sum information from the IC card in clearing.

If commercial transactions by this electronic wallet system are realized, a customer can do his/her daily shopping by only owning an IC card. In this case, it is anticipated that participating shops will also provide a variety of premium services to their customers. However, with previous conventional systems, if a magnetic card is used as a medium for storing point information, two cards consisting of an IC card and a magnetic card are required in payment.

SUMMARY OF THE INVENTION

Accordingly, it is an object of the present invention to provide an arrangement for use with an IC card which is capable of storing a plurality of balances relating to commercial transactions.

Further, it is an object of the present invention to simplify the storage of point information, and use of the point information, when premium services are provided to customers in commercial transactions.

In addition, it is an object of the present invention to provide an arrangement for use with an IC card for commercial transactions that can maintain a plurality of balances to permit convenient small sum transactions without the need for using a security code, with preventing large sum transactions unless a proper security code is entered.

To achieve the above and other objects, the present invention provides an automated transaction terminal operating in conjunction with an IC card for storing electronic money information and point information, IC card reading/writing means for reading and writing information stored in the IC card, IC card control means for controlling the input and ejection of the IC card, and input means for inputting the sum information of a transaction and sales information storage means for storing electronic money information equivalent to the sum information of the transaction.

When a commercial transaction is performed, electronic money equivalent to the sum of the transaction is subtracted from electronic money stored in an IC card which is read by the IC card reading/writing means and is stored in the sales information storage means. When the commercial transaction is performed, the information of a point equivalent to the above sum of the transaction is also stored in the IC card by the IC card reading/writing means.

According to the present invention, when a shop provides a variety of premium services in a commercial transaction by an electronic wallet system, the sum of the transaction can be paid and point information can be managed by only one IC card by storing sum information and point information in the same IC card. A shop issues point information corresponding to the sum of shopping which is stored in an IC card and can provide a cash value coupon or a gift certificate equivalent to this point information to its customer as a premium service.

In the above system, sum information and point information are separately stored in a plurality of areas in an IC card, however, sum information can be also separately be stored in a plurality of areas. In this case, for example, the sum information of a small sum is stored in one area and the sum information of a large sum is stored in the other area. The information of an ordinarily payable sum may be also stored in the area for the sum information of a small sum and the area for the sum information of a large sum may be always locked by personal identification numbers. As a result, as daily payment of a small sum can be freely performed, however, personal identification numbers are required to be input only in the payment of a large sum. Thus, both a normal function as an IC card and a function for providing security when an IC card is lost can be met by one IC card.

BRIEF DESCRIPTION OF THE DRAWINGS

FIG. 2 shows point information storage in the electronic wallet applied system according to the present invention;

FIG. 13 shows point information storage in the electronic wallet applied system equivalent to the fifth embodiment according to the present invention.

DESCRIPTION OF THE PREFERRED EMBODIMENTS

Preferred embodiments according to the present invention will be described below referring to FIGS. 1 to 13.

Figure 1:
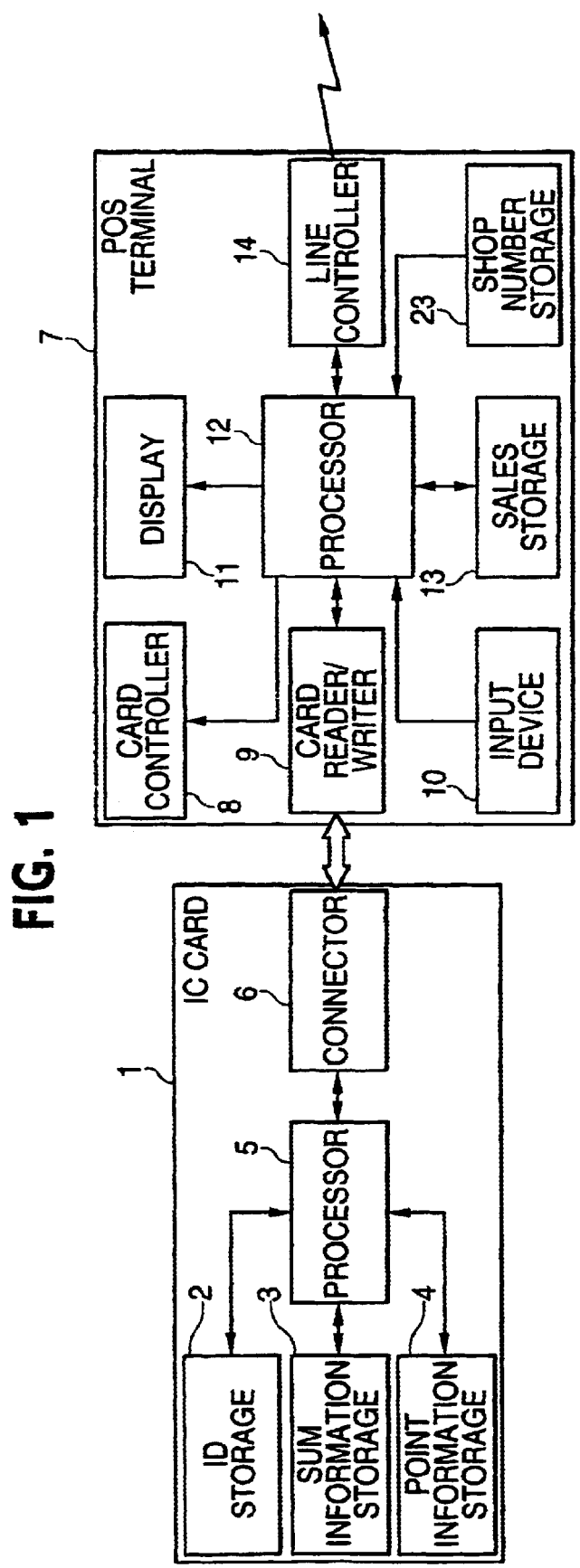
FIG. 1 is a block diagram showing an electronic wallet applied system equivalent to a first embodiment according to the present invention.

FIG. 1 is a block diagram showing an electronic wallet system equivalent to a first embodiment according to the present invention. This is a system in which point information issued by a shop based upon the sum of shopping is stored in an IC card together with sum information of the balance of electronic money so that premium service equivalent to the point information can be provided to its specific customer. In this embodiment, a system in which a customer can do his/her shopping of the sum equivalent to point information will be described as an example.

A reference number 1 denotes an IC card, 2 denotes an ID number storage for storing a personal password and other ID information, 3 denotes a sum information storage for storing the balance of electronic money, 4 denotes a point information storage for storing point information issued by a shop, 5 denotes a processor, 6 denotes a connector, 7 denotes a POS terminal, 8 denotes a card controller, 9 denotes a card reader/writer, 10 denotes an input device, 11 denotes a display, 12 denotes a processor, 13 denotes a sales storage, 14 denotes a line controller and 23 denotes a shop number storage.

FIG. 2 shows an example of the point information storage 4. In this case, a shop number is allocated to each shop beforehand so that a plurality of shops can simultaneously provide premium service based upon point information by one IC card and every shop number, the date of shopping, point information based upon the sum of shopping and the total points are stored. If a customer pays the price of shopping by his/her points, the number of used points is subtracted from the number of points stored in the point information storage 4.

To store his/her point information, a customer is required to contract with a shop beforehand and, at that time, a shop number is registered in the IC card. In the case of a chain store such as a convenience store, points are added to the same shop number by using the same shop number in each store and premium service can be provided from the entire group of chain stores.

Each portion of information stored in the above ID number storage 2, the above sum information storage 3 and the above point information storage 4 is processed by the processor 5. The IC card communicates this processed information with an external POS terminal and others via the connector 6.

The price of a commodity (i.e., an input sum) is input to the POS (point-of-sale) terminal via the input device 10 in the POS terminal 7 and the input sum and other information is displayed on the display 11. Electronic money information sent to the POS terminal 7 via the card reader/writer 9 is stored in the sales storage 13 and sales for a day can be sent to a bank via a telephone line by access to the bank via the line controller 14.

Figure 3:
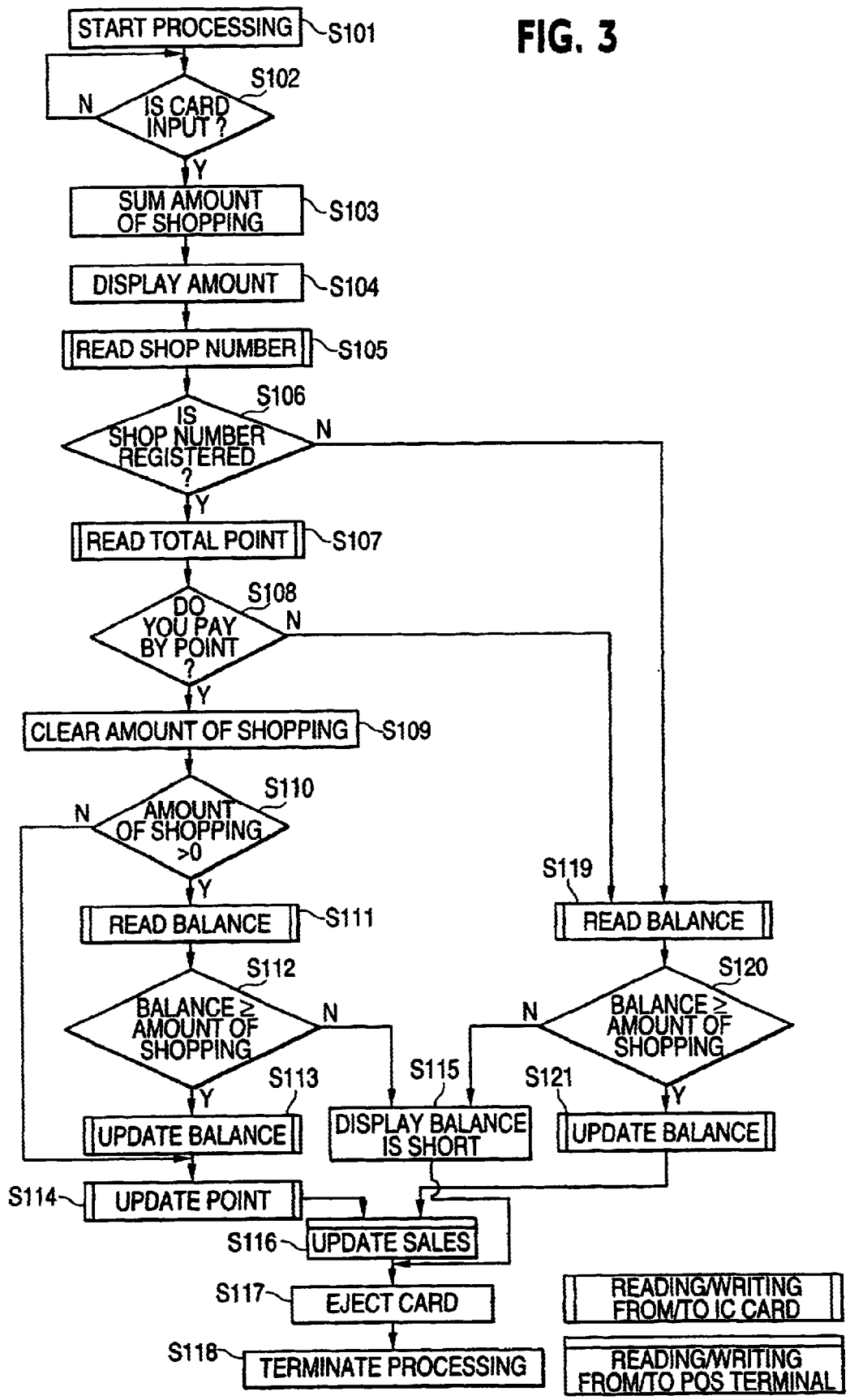
FIG. 3 is a flowchart showing processing by the electronic wallet applied system according to the present invention.

Next, processing for clearing of shopping and point information will be described referring to FIG. 3. When a customer inserts his/her IC card into a POS terminal in payment at a shop (step S102) and a salesclerk thereof totalizes the sum of shopping (step S103), the totalized sum is displayed on the display 11 in a step S104. Afterward, a shop number stored in the point information storage 4 in the IC card is read in a step S105 and the processor 5 determines in a step S106 whether a shop number stored in the shop number storage 23 in the POS terminal is registered in the IC card or not.

First, a case in which a shop number is registered will be described. In this case, since the customer is a registered customer of the specific shop, he/she can be provided premium service equivalent to point information in the IC card. When point information in the IC card is read by the card reader/writer in the POS terminal in a step S107, the customer judges whether he/she wants to use those points for shopping or not (step S108).

If the customer pays the price of shopping by his/her points, the sum paid by his/her points is subtracted from the total sum of shopping in a step S109. As clearing by electronic money is not performed if the total sum of shopping is paid by his/her points, the number of used points is subtracted from his/her total points and only the point information storage in the IC card is updated in a step S114.

In the meantime, if the price of shopping is paid by a combination of his/her points and electronic money, the balance of electronic money stored in the sum information storage 3 is read in a step S111. The processor 5 determines in a step S112 whether the balance of shopping after a part of the sum of shopping is paid by his/her points can be paid by his/her electronic money or not. If the balance can be paid, it is subtracted from the sum of his/her electronic money stored in the IC card, the sum information storage 3 is updated in a step S113 and the point information storage 4 is also updated in a step S114. If the balance cannot be paid by his/her electronic money, the IC card is ejected from the POS terminal in a step S117 after it is displayed on the display 11 in a step S115 that the balance of the IC card is short and the transaction is stopped in a step S118.

If payment is not performed by the customer's points, the total amount of shopping is required to be paid by electronic money. In this case, first the balance of electronic money stored in the IC card is also read as described above in a step S119. Afterward, if the balance of electronic money is short, the transaction is stopped. If the total amount of shopping can be paid by electronic money, it is subtracted from electronic money stored in the IC card and the sum information storage 3 is updated in a step S121.

As described above, if the shop number is registered in the IC card, the price of shopping is paid by his/her point and electronic money stored in the IC card, the sales storage 13 in the POS terminal is updated in a step S116 after the completion of payment, the IC card is ejected in a step S117 and the processing is finished in a step S118.

Next, a case in which a shop number is not registered will be described. In this case, the total amount of shopping is required to be paid by electronic money. First, the balance of electronic money stored in the sum information storage 3 is read in a step S119. The processor 5 determines in a step S120 whether the total amount of shopping can be paid by electronic money or not. If the total amount can be paid, electronic money equivalent to the sum of shopping is subtracted from the IC card, after the sum information storage 3 is updated in a step S121, the IC card is ejected in a step S117 and the processing is finished in a step S118.

On the other hand, if the total amount of shopping cannot be paid by electronic money, the IC card is ejected from the POS terminal in a step S117 after it is displayed on the display 11 in a step S115 that the balance of the IC card is short and the transaction is stopped in a step S118.

A system for storing point information based upon the sum of shopping in an IC card is described above. According to this system, premium service based upon the sum of shopping can be provided to a customer specific to a shop and the above point information and electronic money information can be stored in one IC card. In this embodiment, point information is stored only in an IC card 1, however, it may be also stored both in the POS terminal 7 and in an IC card 1.

Writing point information to an IC card will now be further described in detail. In the above embodiment, for premium service, the sum of shopping equivalent to point information can be done, however, when point information is falsified, shopping can be done unfairly. Therefore, the shop number storage 23 for registering a shop number is provided in the POS terminal and the point information storage is controlled by the processor 5 so that point information can be written only in case shop numbers are equal when point information is written to the point information storage 4 in an IC card. As a result, as point information cannot be update except at the shop, unfairness can be prevented.

Figure 12:
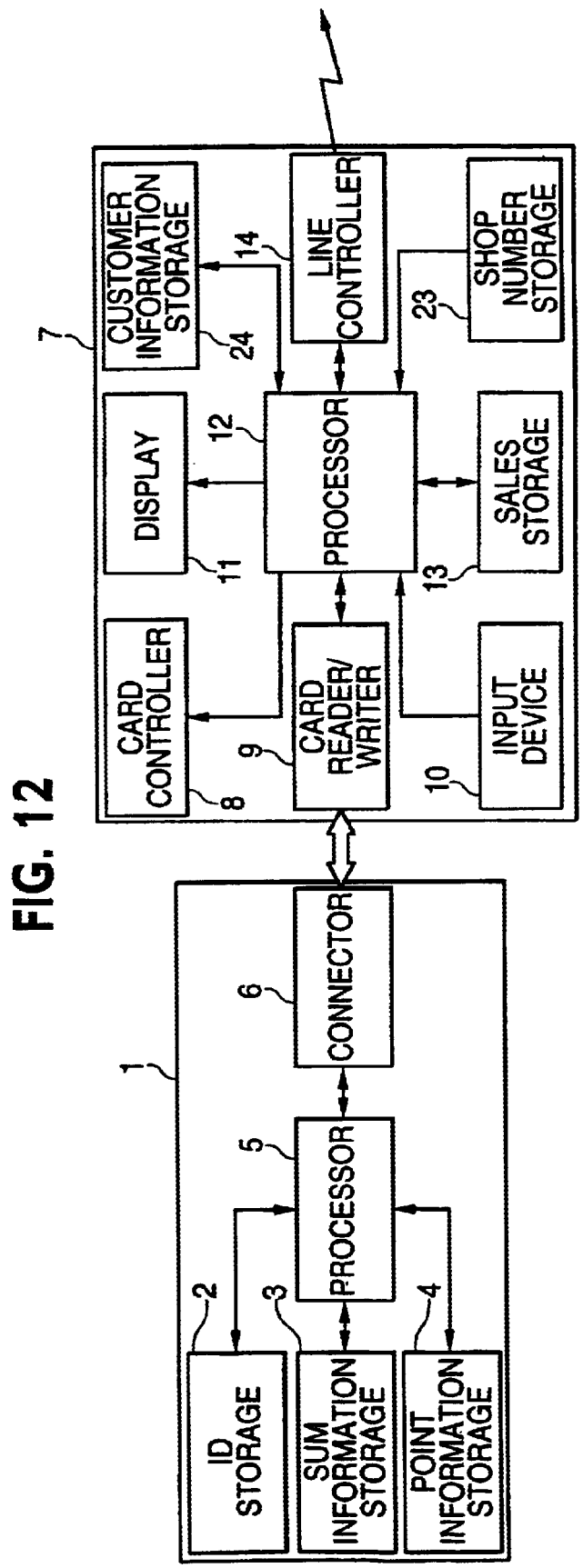
FIG. 12 is a block diagram showing an electronic wallet applied system equivalent to a fifth embodiment according to the present invention.

Next, FIG. 12 is a block diagram showing an electronic wallet system equivalent to a fifth embodiment according to the present invention. A reference number 24 denotes customer information storage. In the case of the embodiment shown in FIG. 1, any customer owning an IC card in which a shop number is registered receives the same premium service. However, the contents of premium service can be changed depending upon the particular identity of the customer by also storing customer information in a POS terminal as shown in FIG. 12. As an example, special service can be provided for new customers for a fixed period after registration with a shop, such as providing twice as many points as usual are provided can be readily provided.

Information showing the contents of service is stored in the IC card of a customer in place of storing customer information in a POS terminal, a terminal in a shop reads this information and the contents of premium service can be also changed depending upon the particular identity of the customer. In this case, as shown in FIG. 13, information showing the contents of service corresponding to a shop number is stored in the point information storage 4 in an IC card. In a transaction, information showing the contents of service is read and different service can be provided for every customer by changing the contents of service according to read information, for example, the addition of points by 7% in the case of a customer A and addition of points by 5% in the case of a customer B.

Figure 4:
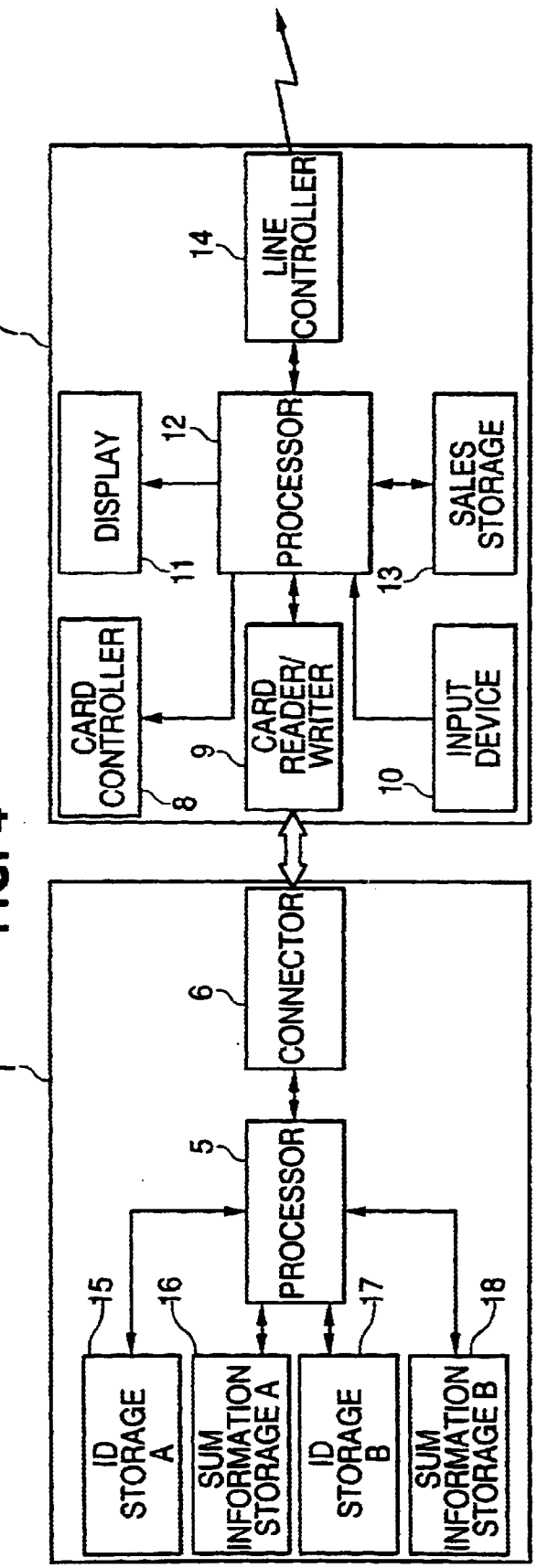
FIG. 4 is a block diagram showing an electronic wallet applied system equivalent to a second embodiment according to the present invention.

Next, FIG. 4 is a block diagram showing an electronic wallet system equivalent to a second embodiment according to the present invention. This is a system for providing a plurality of sum information storage in one IC card. These sum information storage are classified into a large sum information storage and a small sum information storage. The large sum information storage is ordinarily locked by personal identification numbers, however, the small sum information storage is ordinarily not locked. Therefore, since personal identification numbers are required to be input in paying a large sum, but are not required to be input in paying a small sum such as the price of a tobacco and a telephone charge, both a convenient normal function and a function for providing security when an IC card is lost can be met by one IC card.

Referring to FIG. 4, a reference number 15 denotes an ID number storage A, 16 denotes a sum information storage A, 17 denotes an ID number storage B and 18 denotes a sum information storage B. Electronic money stored in the sum information storage A is used to pay small sums and electronic money stored in the sum information storage B is used to pay large sums. The sum information storage A is locked by personal identification numbers registered in the ID number storage A and the sum information storage B is locked by personal identification numbers registered in the ID number storage B.

While being locked by personal identification numbers, the input of personal identification numbers registered in an IC card is required in paying by electronic money and if the personal identification numbers are not input correctly, payment by electronic money in an IC card is disabled. Therefore, to prevent a lost IC card from being used unfairly, it is desirable that the sum information storage is ordinarily locked by personal identification numbers. However, in this case, inputting of personal identification numbers is required for every normal payment, no matter how small, and a problem occurs that the facility and convenience of an IC card is deteriorated.

Figure 5:
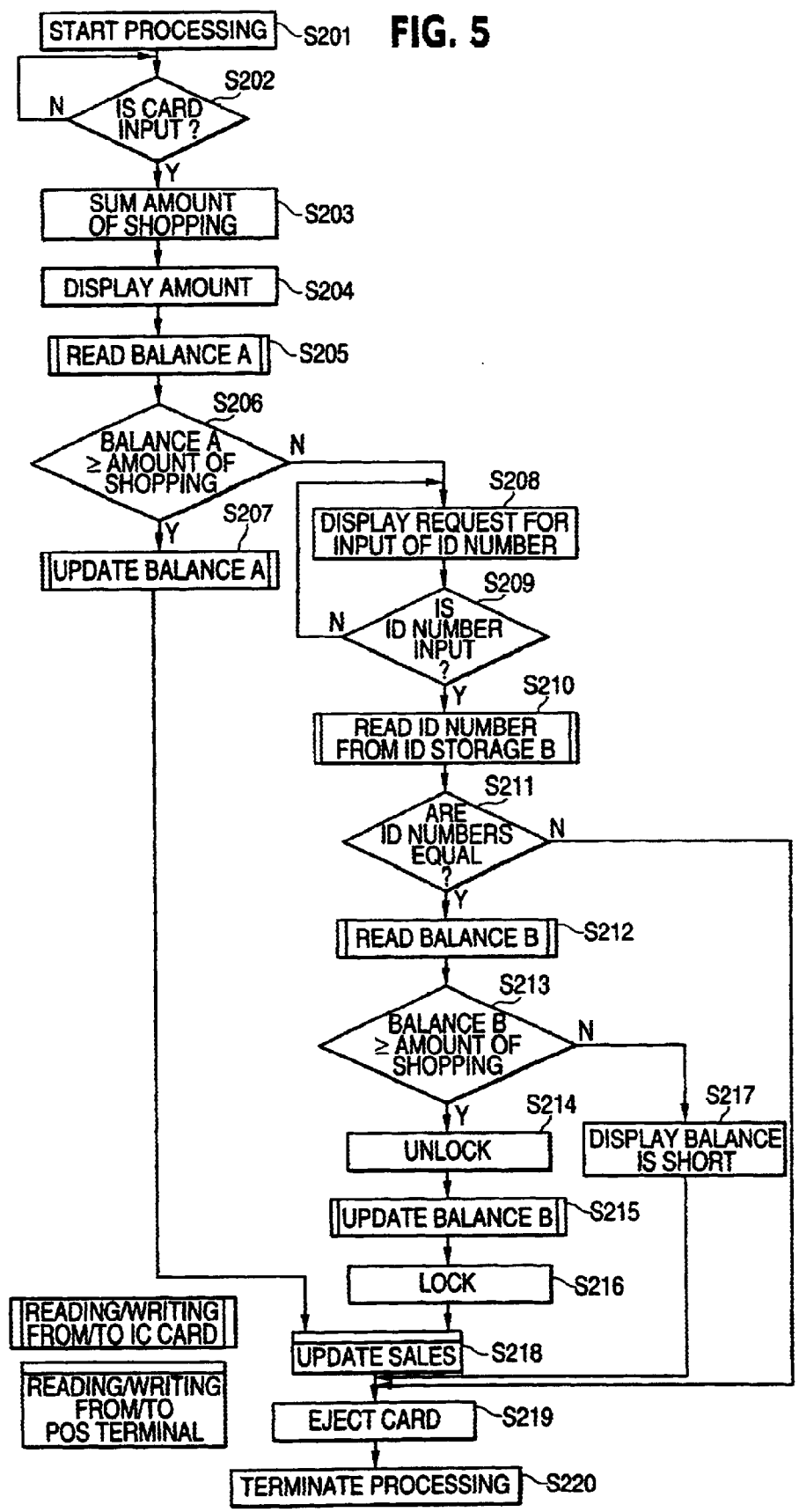
FIG. 5 is a flowchart showing processing by the electronic wallet applied system equivalent to the second embodiment according to the present invention.

As shown in FIG. 4, a "pocket A" for paying a small sum and a "pocket B" for paying a large sum are provided in one IC card, and the pockets A and B are switched based upon a paid sum. Referring to FIG. 5, concrete processing will be described below.

When a customer pays in a shop, he/she inserts his/her IC card into a POS terminal there (a step S202) and when a salesclerk there totalizes the sum of shopping (a step S203), the total amount is displayed on a display 11 in a step S204. Afterward, the balance A of electronic money stored in the sum information storage A in the pocket A is read by a card reader/writer 9 in a step S205 and a processor 12 in the POS terminal determines in a step S206 whether the sum of shopping can be paid or not.

In this case, as the balance A is for paying a small sum, the sum information storage A is updated in a step S207 if the sum of shopping can be paid, and a sales storage 13 in the POS terminal is updated in a step S218. On the other hand, in the case of paying a large sum, as the balance A is not enough to pay a large sum and a large sum cannot be paid by the balance A, payment using the pocket A is automatically switched to payment by the balance stored in the sum information storage B in the pocket B.

As the sum information storage B is ordinarily locked by personal identification numbers registered in the ID number storage B, words for prompting a customer to input his/her ID number are displayed on the display 11 in a step S208. When the customer inputs his/her personal identification numbers via an input device 10 (step S209), his/her personal identification numbers registered in the ID number storage B are read in a step S210 and a processor 5 determines in a step S211 whether the read personal identification numbers are equal to those input via the input device 10 or not. As the IC card may be used unfairly if personal identification numbers are not equal, the IC card is ejected in a step S219 and the transaction is stopped in a step S220. In the meantime, if personal identification numbers are equal, the balance B stored in the sum information storage B is read in a step S212 and the processor 5 determines in a step S 213 whether the sum of shopping can be paid or not.

If payment by electronic money is enabled, the sum information storage B is unlocked in a step S214 and the sum of shopping is subtracted from electronic money in an IC card. After the balance B of the sum information storage B is updated in a step S215, the sum information storage B is automatically locked by the above personal identification numbers in a step S216. Further, after the sales storage 13 in the POS terminal is updated in a step S218, the IC card is ejected in a step S219 and the processing is finished in a step S220.

On the other hand, if payment is disabled, the IC card is ejected in a step S219 after it is displayed on the display 11 that the balance B is short in a step S217 and the transaction is stopped in a step S220.

In summary, a system in which a plurality of sum information storage are provided in one IC card has been described above. In this system, the plurality of sum information storage are classified into a large sum information storage and a small sum information storage and both of a normal convenient function and a function for providing security when an IC card is lost can be met by one IC card by ordinarily using the small sum information storage without locking it while the large sum information storage is ordinarily locked by personal identification numbers.

Figure 6:
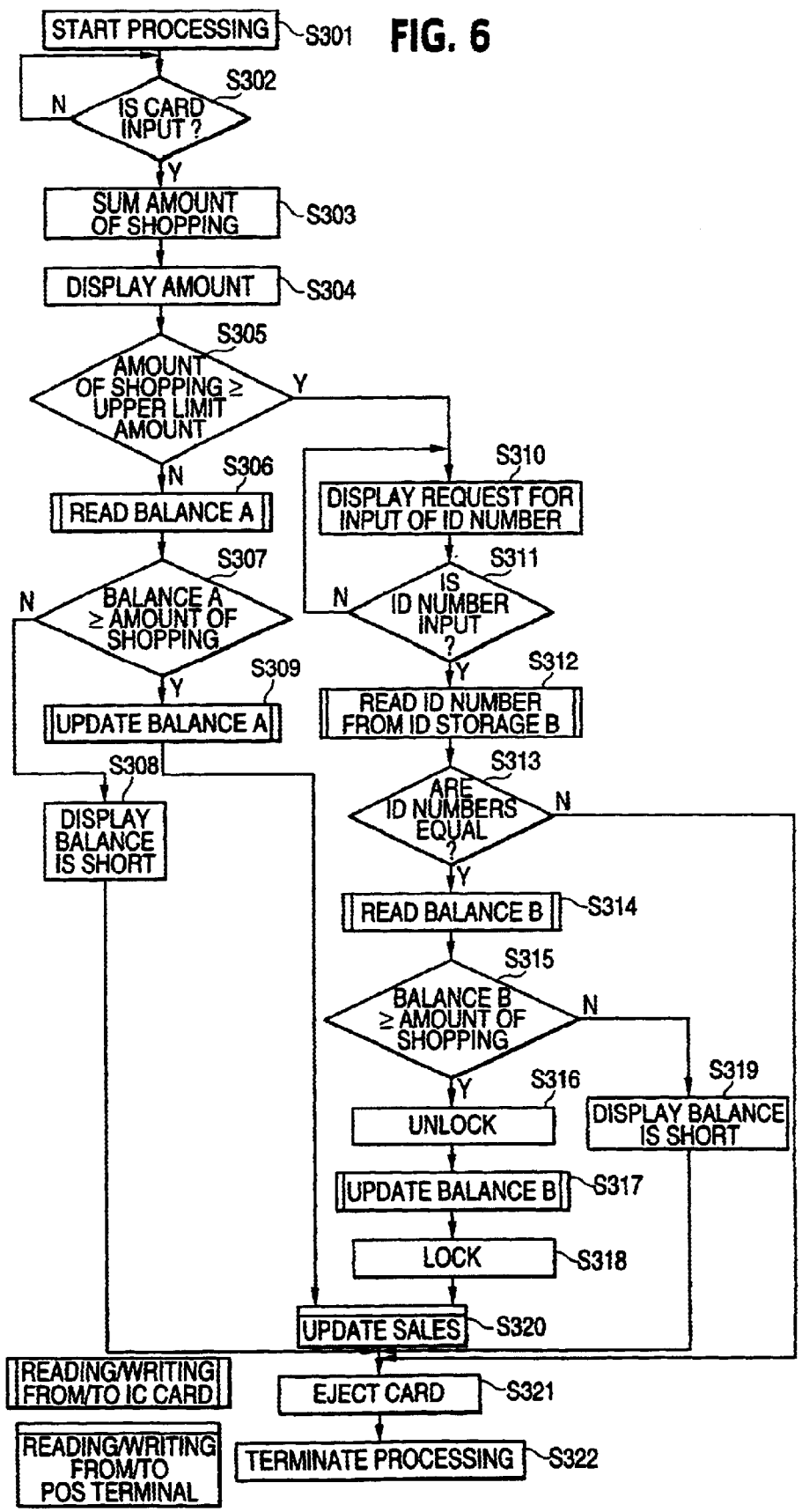
FIG. 6 is a flowchart showing processing by another example of the electronic wallet applied system equivalent to the second embodiment according to the present invention.

In the FIG. 5 process, a system is used in which, when a large sum is to be paid, the balance of the small sum information storage A is first determined to be short in step 206. In other words, the total amount of the small sum storage A provides the upper limit value to the receivable sum of electronic money which can be paid from the sum information storage A in an IC card. If payment by electronic money stored in the small sum information storage A is not possible because the requested amount is too large, automatically the system is switched for payment by electronic money stored in the large sum information storage B. However, as shown in FIG. 6, an upper limit sum may be set in the step 305 beforehand for the maximum amount of payment by electronic money stored in the sum information storage A which will be permitted. If the upper limit sum is exceeded, payment by electronic money stored in the small sum information storage A will be automatically switched to payment by electronic money stored in the large sum information storage B. In the embodiment of FIG. 6, as an upper limit value is set for the receivable sum stored in the sum information storage A, electronic money equal to or larger in sum than the upper limit value cannot be paid from an IC card unless personal identification numbers are correctly input, unlike the embodiment shown in FIG. 5, even if the amount of money available in the sum information storage A would be sufficient to pay the amount requested.

Figure 7:
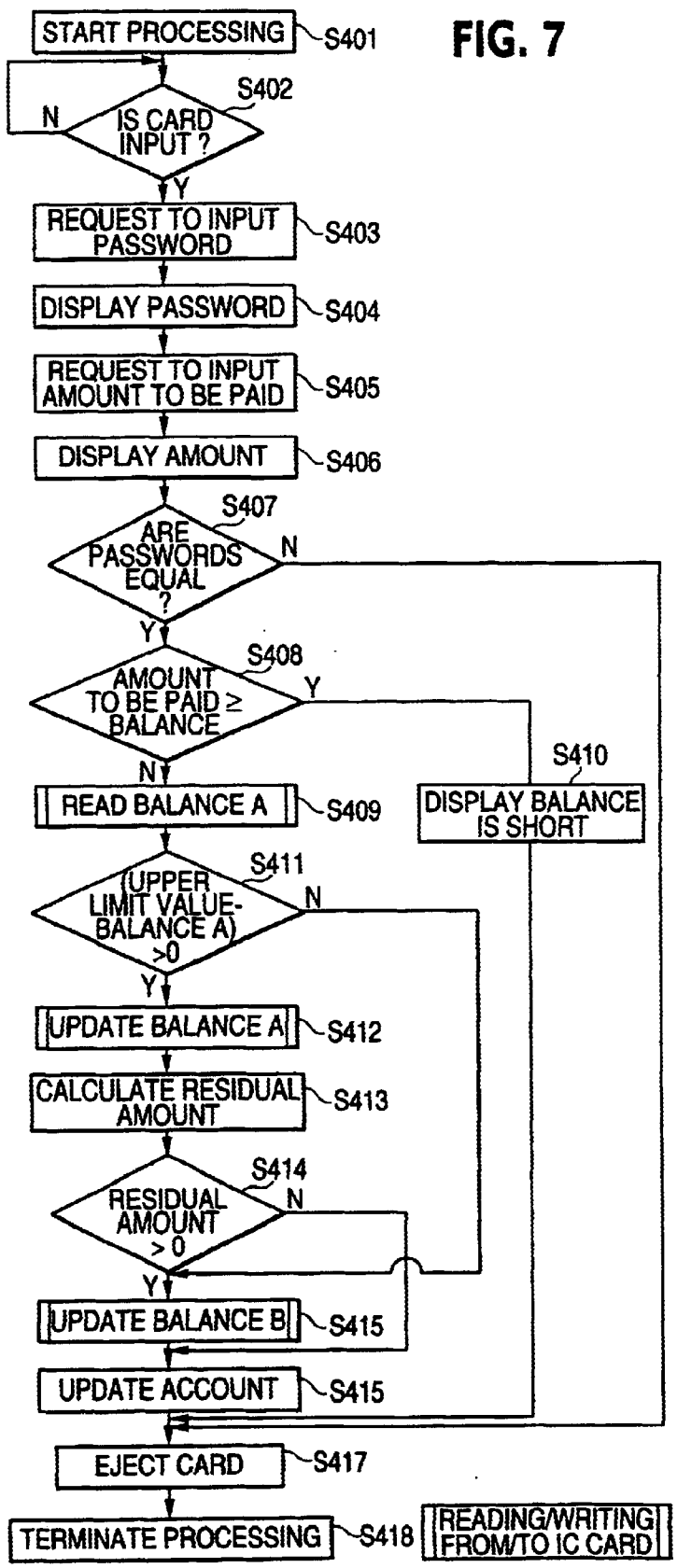
FIG. 7 is a flowchart showing processing for paying electronic money with an IC card by the electronic wallet applied system according to the present invention.

FIG. 7 is a flowchart showing processing for paying electronic money with an IC card in the embodiment shown in FIGS. 5 and 6. In this case, money can be remitted from a customer's account to his/her IC card by inserting the IC card into an ATM (Automatic Teller Machine) of a bank or accessing a bank via a telephone line. When a customer inserts his/her IC card (step S402) and inputs his/her personal identification numbers (step S403), the personal identification numbers are displayed in a step S404. Next, when a sum to be paid from his/her bank account is input in a step S405, the sum is displayed in a step S406.

The bank checks in a step S407 whether the input personal identification numbers are equal to those registered in the IC card or not, and, if they are not equal, it is determined that the IC card is used unfairly, the IC card is ejected in a step S 417 and the transaction is stopped.

On the other hand, if both personal identification numbers are equal, it is determined in a step S408 whether a sum to be paid from the customer's bank account is equal to or smaller than the balance of the account or not, and, if the sum can be paid, the balance A of the sum information storage A in the IC card is read in a step S409. If the sum cannot be paid, it is displayed in a step S410 that the balance of the customer's bank account is short and the transaction is stopped.

Next, as an upper limit value is set to the receivable sum of the sum information storage A in the IC card, it is calculated in a step S411 how much money is receivable to the upper limit value by calculating an expression "upper limit value−balance A". If money can be received in the sum information storage A, the balance A is updated in a step S412 and afterward, the remainder of the sum paid from the customer's bank account is calculated in a step S413. If a remainder exists, his/her bank account is updated in a step S416 after the sum of this remainder is added to the sum information storage B in the IC card in a step S415. However, if no remainder exists, the balance of the bank account is immediately updated.

In the meantime, if the balance A of the sum information storage A is equal to the upper limit value, the total amount withdrawn from the customer's bank account is added to the sum information storage B in a step 415.

As described above, electronic money exceeding the upper limit value cannot be stored in the sum information storage A and the remainder is automatically added to the sum information storage B.

In the embodiment shown in FIG. 4, a plurality of ID number storage are provided in one IC card, however, only one ID number storage may be provided and the large sum information storage may be also unlocked using personal identification numbers stored in this storage. In this embodiment, two sum information storage of the large sum information storage and the small sum information storage are provided, however, two or more sum information storage may be provided and they may be also automatically or manually switched for payment.

Figure 8:
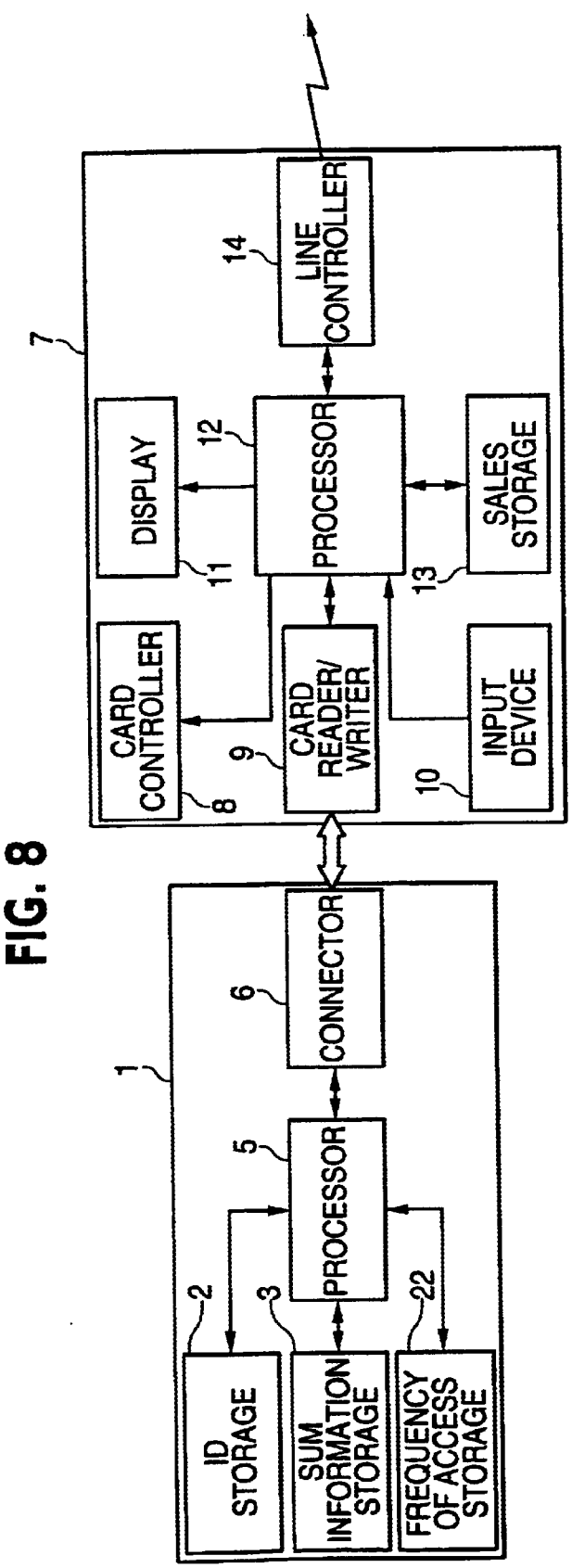
FIG. 8 is a block diagram showing an electronic wallet applied system equivalent to a third embodiment according to the present invention.
Figure 9:
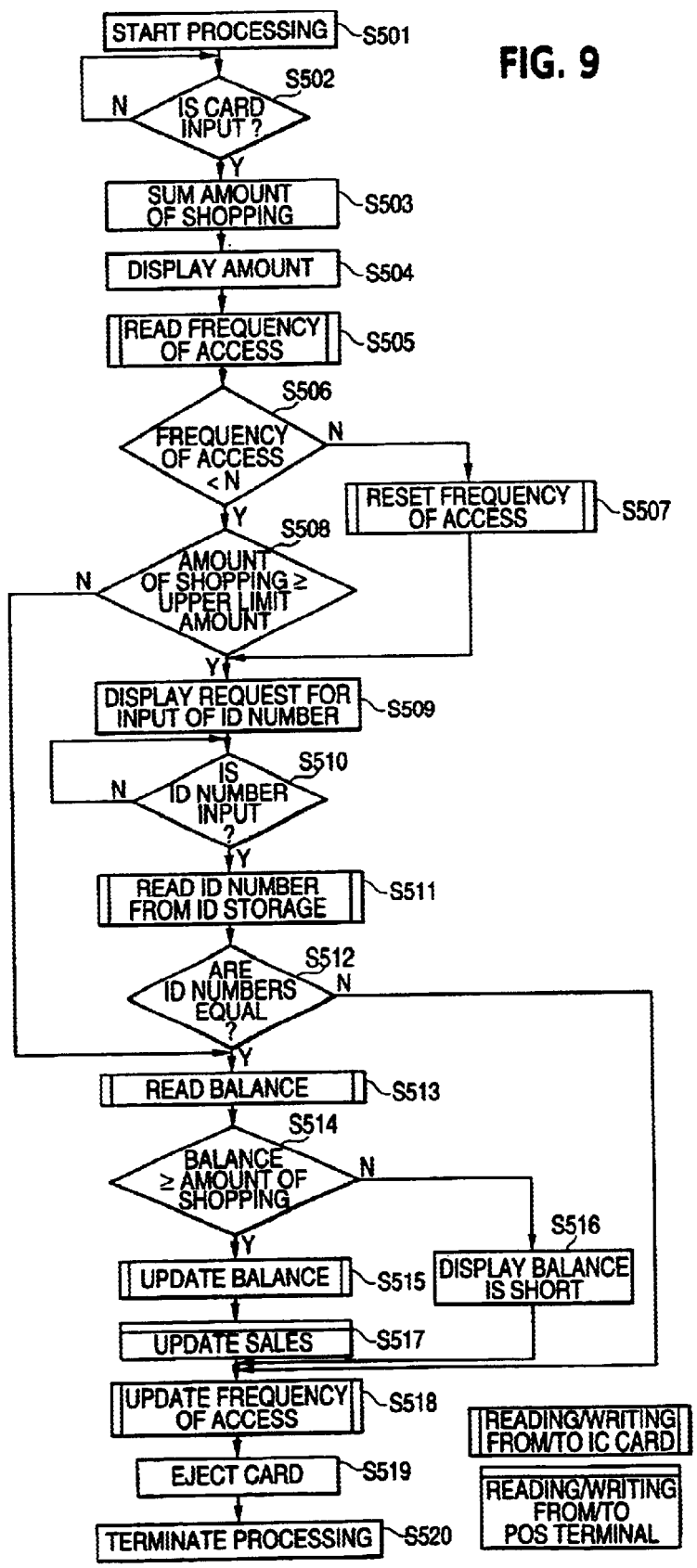
FIG. 9 is a flowchart showing processing by the electronic wallet applied system equivalent to the third embodiment according to the present invention.

In the above embodiment, payment by electronic money stored in the small sum information storage is switched to payment by electronic money stored in the large sum information storage by providing a plurality of sum information storage in an IC card. However, as shown in FIG. 8, only one sum information storage may be provided in an IC card and the input of personal identification numbers may be also required depending upon a withdrawn sum. However, in this case, since small sums of electronic money can be freely withdrawn until the balance stored in an IC card is short, the total amount of the balance stored in an IC card could be withdrawn when the IC card is used unfairly. Therefore, security can be also provided by automatically requiring the input of personal identification numbers when small sums of electronic money are withdrawn by a fixed frequency N. Referring to FIG. 9, the details will be described below. A reference number 22 in FIG. 9 denotes an access frequency storage for storing the frequency of access to an IC card.

When a customer inserts his/her IC card into a POS terminal (step S502) in payment in a shop and a salesclerk there totalizes the sum of shopping (step S503), the total sum of shopping is displayed in a step S504. Afterward, the frequency of access to the IC card stored in the access frequency storage 22 in the IC card is read by a card reader/writer in a step S505.

If this frequency of access reaches a fixed frequency N, the input of the customer's ID number is automatically required in a step S509. However, if the frequency of access is smaller than a fixed frequency N, the input of the ID number is required only if the sum of shopping exceeds a predetermined upper limit value in a step S508. If the frequency of access reaches a fixed frequency N, the access frequency storage 22 in the IC card is reset in a step S507 and restored to an initial value.

If an input ID number and an ID number registered in the IC card are equal in a step S512, the balance stored in the IC card is read in a step S513. However, if they are not equal, the IC card is ejected in a step S519 after the frequency of access is updated in a step S518 and the transaction is stopped in a step S520.

When the balance stored in the IC card is read, it is determined in a step S514 whether the sum of shopping can be paid by the balance stored in the IC card or not. If the sum of shopping can be paid, the balance stored in the IC card is updated in a step S515 and a sales storage in the POS terminal is updated in a step S517. After the frequency of access is updated, the IC card is ejected and the processing is finished. In the meantime, if the sum of shopping cannot be paid, the IC card is ejected after it is displayed that the balance is short in a step S516 and the processing is stopped.

As described above, only one sum information storage is provided in an IC card and the input of personal identification numbers may be also required depending upon a withdrawn sum. In this case, a limitation can be imposed on unfair use by requiring the input of personal identification numbers when the frequency of access to the IC card reaches a fixed frequency N.

In the above embodiments shown in FIGS. 4 to 7, a plurality of sum information storage are classified into a large sum information storage and a small sum information storage, however, they may be also classified for other purposes of payment. For example, in the case of an office worker, clearing money expended for a business trip can be simplified by classifying money used for his/her business and money used privately in one IC card and switching them depending upon a purpose in payment. For example, as shown in a flowchart in FIG. 11, public money used for the business of a company is stored in a pocket A, while money used privately is stored in a pocket B, and they can be readily switched by a user in paying electronic money.

For example, a sum information storage dedicated to payment to a specific railroad corporation can be also provided to a plurality of sum information storage. In this case, service can be also provided to a user by adding a fixed premium to the dedicated sum information storage.

Figure 10:
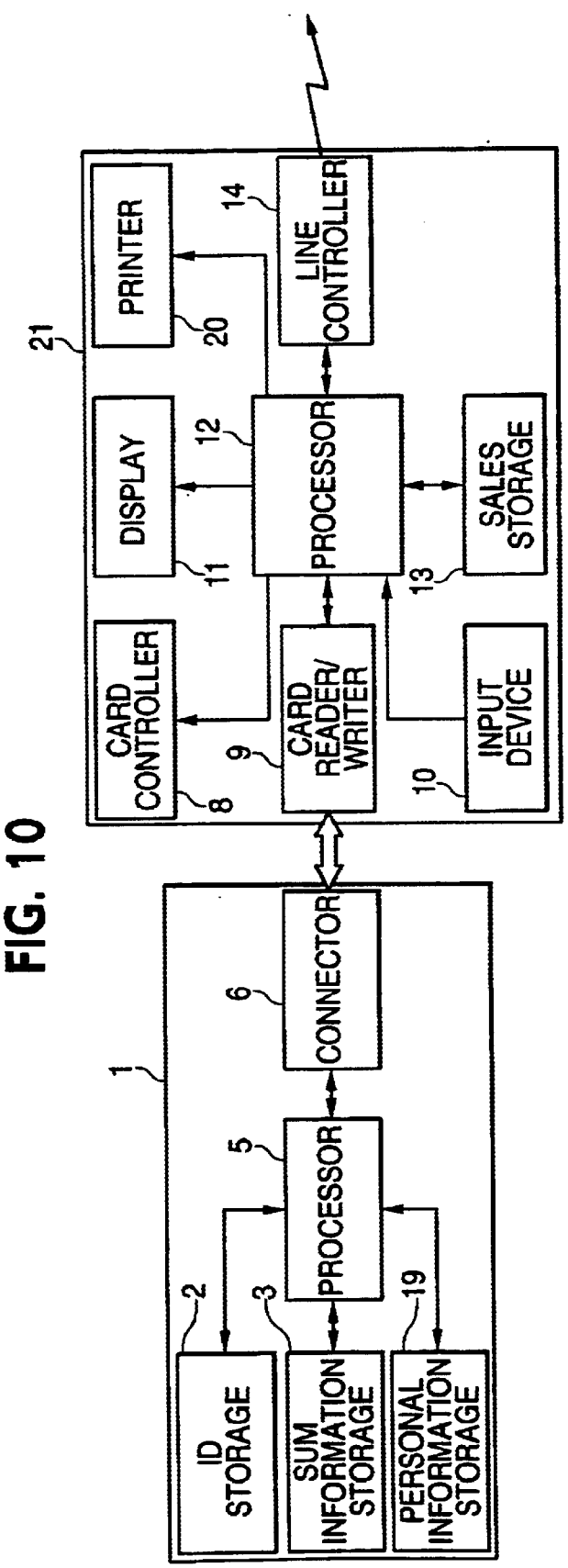
FIG. 10 is a block diagram showing an electronic wallet applied system equivalent to a fourth embodiment according to the present invention.
Figure 11:
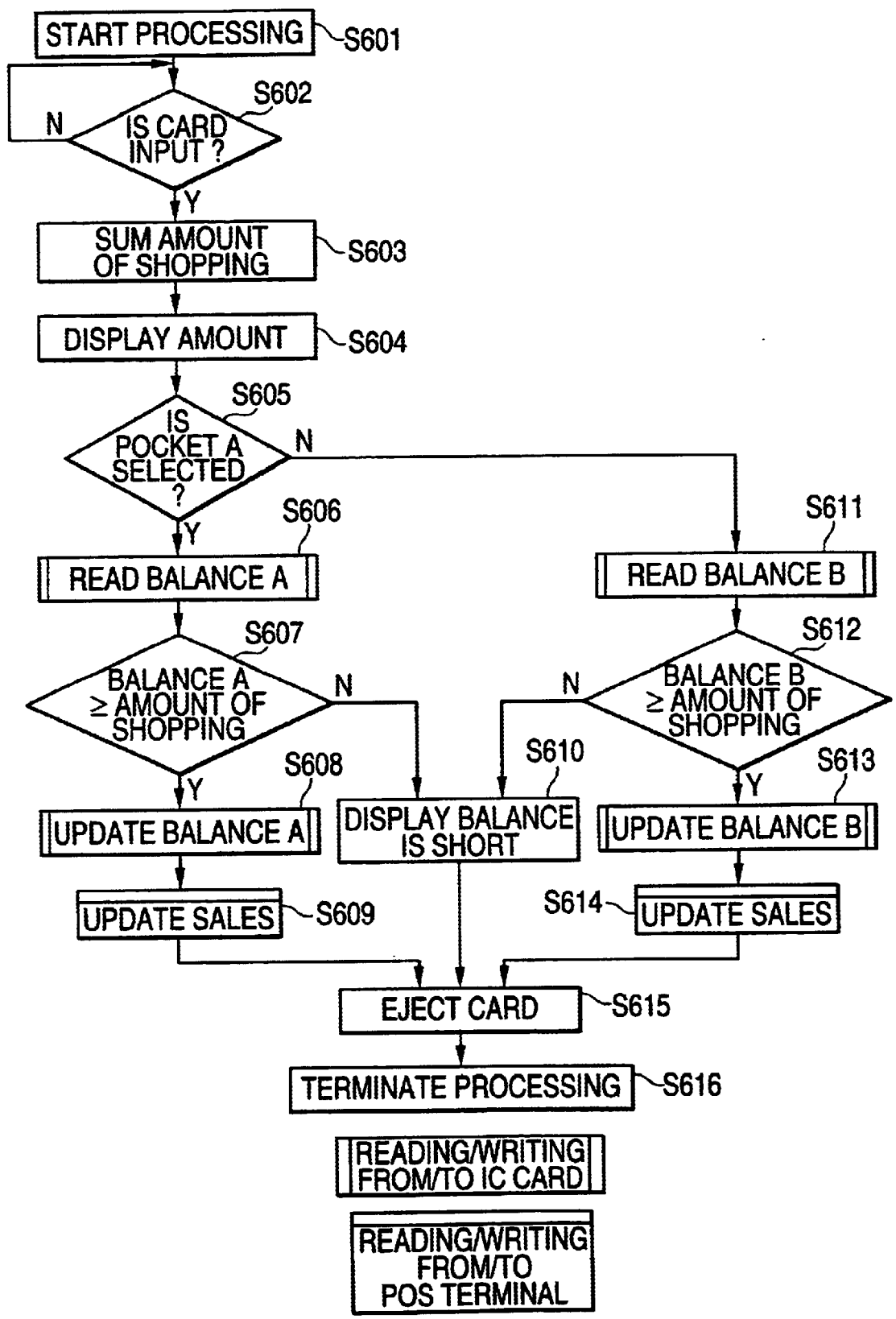
FIG. 11 is a flowchart showing processing by the electronic wallet applied system equivalent to the fourth embodiment according to the present invention.

Next, FIG. 10 is a block diagram showing an electronic wallet system equivalent to a fourth embodiment according to the present invention. This is a system in which sum information and personal information such as an address and a telephone number are stored in one IC card and in this embodiment, a case that an address is entered for door-to-door service will be described below.

Referring to FIG. 10, a reference number 19 denotes a personal information storage for storing a name, an address and a telephone number. A reference number 20 denotes a printer for printing the above personal information on an invoice for door-to-door service. A reference number 21 denotes a POS terminal in which a function for printing personal information is built.

If a customer requests door-to-door service to deliver a package, he/she passes his/her IC card to a clerk there and pays for the package by electronic money stored in a sum information storage 3. His/her address and name can be automatically printed in the field of a client of the invoice by the printer 20 by reading personal information stored in the personal information storage 19. In this case, items in the field of a destination are handwritten, however, if the information of the destination is also stored in the personal information storage 3, required information can be automatically printed in the field of the destination.

According to the present invention, when a shop provides a variety of premium service in a commercial transaction by an electronic wallet system, the sum of shopping can be paid and point information can be managed in only one IC card by storing sum information and point information in the IC card.

In the above system, sum information and point information are separately stored in a plurality of areas in an IC card, however, sum information can be also separately stored in a plurality of areas. In this case, sum information stored in one area is used for payment of a small sum and sum information stored in the other area is used for payment of a large sum. Thus, both a normal convenient function and a function for providing security when an IC card is lost can be met by one IC card by ordinarily enabling payment in the area for payment of a small sum and ordinarily locking the area for payment of a large sum by personal identification numbers.

While the present invention has been described in detail and pictorially in the accompanying drawings it is not limited to such details since many changes and modifications recognizable to those of ordinary skill in the art may be made to the invention without departing form the spirit and the scope thereof.

What is claimed is:

1. An IC card, for performing a commercial transaction by inserting said IC card into a terminal, comprising:
   a storage area for storing a plurality of balances of points given by a plurality of shops; and
   a processor which updates said balances of points according to an instruction from said terminal;
   wherein said storage area stores a plurality of shop numbers to identify each shop, and said processor updates a balance of points corresponding to a shop number; and
   wherein said storage area stores a level of service with said shop number.

2. An IC card, for performing a commercial transaction by inserting said IC card into a terminal, comprising:
   a storage area for storing a plurality of balances of points given by a plurality of shops; and
   a processor which updates said balances of points according to an instruction from said terminal;
   wherein said storage area stores a plurality of shop numbers to identify each shop, and said processor updates a balance of points corresponding to a shop number; and
   wherein said storage area stores point adding rates with said shop numbers, and said balance of points is based on said point adding rate.

3. An IC card terminal, for performing a commercial transaction by inserting said IC card into a terminal, comprising:
   a storage area for storing a plurality of balances of points given by a plurality of shops; and
   a processor which updates said balances of points according to an instruction from said terminal;
   wherein said storage area stores a plurality of shop numbers to identify each shop, and said processor updates a balance of points corresponding to a shop number; and wherein said IC card stores a level of service with said shop number, and said processor updates a point balance based on said level of service.

4. An IC card terminal according to claim 3, wherein said level of service is an adding rate of points.

5. An IC card for storing sum information and for performing a commercial transaction by inserting said IC card into a terminal and updating said sum information, comprising:

first storage area for storing a first balance;

a second storage area for storing a second balance;

an ID storage area for storing an identification number; and a processor for updating said first and second balances stored in said first and second storage areas according to an instruction from said terminal, wherein:
said first balance and said second balance are both balances of sums of electronic money, and
said processor updates said first balance in said first storage area without inquiring for said identification number, and
said processor updates said second balance in said second area, and
said identification number is inquired for each time before said processor updates said second balance, and
wherein said first balance has a predetermined upper limit on the amount of electronic money that can be stored in the first storage area which is less than an amount of electronic money that can be stored in the second storage area.

6. An IC card according to claim 5, wherein said processor locks said second storage area.

7. An IC card according to claim 5, wherein said processor updates said first balance in said first storage area if said sum of a transaction is equal to or smaller than an upper limit sum of said first balance without inquiring for said identification number, and said processor updates said second balance in said second area if a sum of a transaction is equal to or larger than said upper limit sum of first balance.

8. An IC card terminal for performing a commercial transaction by updating sum information stored in an IC card which has a first storage area storing a first balance of electronic money, a second storage area storing a second balance of electronic money and an ID storage area which stores an identification number, comprising:

an input device for inputting an instruction in relation to a transaction;

an IC card reader/writer for reading and writing said first and second balance from/to said IC card; and a processor for subtracting a sum of transaction from said first balance in said first area without inquiring for said identification number and for subtracting a sum of transaction from said second balance in said second area after inquiring for said identification number, wherein said first balance has a predetermined upper limit on the amount of electronic money that can be stored in the first storage area which is less than an amount of electronic money that can be stored in the second storage area.

9. An IC card terminal according to claim 8, wherein said processor subtracts a sum of transaction from said first balance in said first area if said sum of a transaction is equal to or smaller than an upper limit sum of said first balance without inquiring for said identification number, and said processor subtracts a sum of transaction from said second balance in said second area if a sum of a transaction is equal to or larger than said upper limit sum of first balance.

10. An IC card terminal according to claim 8, wherein said processor locks said second storage area.

11. An IC card for storing sum information and for performing a commercial transaction by inserting said IC card into a terminal and updating said sum information, comprising:

a storage area for storing a balance of electronic money;

an ID storage area for storing an identification number; and a processor for updating said balance stored according to an instruction from said terminal, wherein:
said identification number is inquired for once within a plurality of times before said processor updates said balance if a sum of a transaction is equal to or smaller than an predetermined upper limit sum, and
said identification number is inquired for each time before said processor updates said balance if a sum of a transaction is larger than said predetermined upper limit sum.

12. An IC card terminal for performing a commercial transaction by updating sum information stored in an IC card which has a storage area for storing a balance of electronic money and an ID storage area for storing an identification number, comprising:

an input device for inputting an instruction in relation to a transaction;

an IC card reader/writer for reading and writing said balance from/to said IC card; and a processor for subtracting a sum of transaction from said balance in said IC card if a sum of a transaction is equal to or smaller than a predetermined upper limit sum after inquiring for said identification number once with a plurality of times, wherein said processor subtracts sums of transactions at other times within said plurality of times without inquiring for said identification number if the sum of the transaction is equal to or smaller than said upper limit sum, and for subtracting a sum of transaction from said balance in said IC card if a sum of a transaction is larger than said upper limit sum only after inquiring for said identification number each time a transaction is larger than said upper limit sum.

13. An IC card according to claim 5, wherein said first balance in said first storage area is updated if a sum of transaction is equal or smaller than said first balance, and said second balance in said second storage area is updated if a sum of transaction is larger than said first balance.

14. An IC card terminal according to claim 8, wherein said first balance in said first storage area is updated if a sum of transaction is equal or smaller than said first balance, and said second balance in said second storage area is updated if a sum of transaction is larger than said first balance.

* * * * *